US012134930B2

(12) United States Patent
Uchibori et al.

(10) Patent No.: US 12,134,930 B2
(45) Date of Patent: Nov. 5, 2024

(54) VEHICLE DOOR OPENING/CLOSING CONTROL SYSTEM, VEHICLE DOOR OPENING/CLOSING METHOD AND RECORDING MEDIUM RECORDED WITH DOOR OPENING/CLOSING PROGRAM

(71) Applicant: TOYOTA JIDOSHA KABUSHIKI KAISHA, Toyota (JP)

(72) Inventors: Kazuma Uchibori, Kasugai (JP); Hiroshi Mizobata, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 831 days.

(21) Appl. No.: 17/172,142

(22) Filed: Feb. 10, 2021

(65) Prior Publication Data

US 2021/0310295 A1 Oct. 7, 2021

(30) Foreign Application Priority Data

Apr. 6, 2020 (JP) .................................. 2020-068437

(51) Int. Cl.
*E05F 15/76* (2015.01)
*E05F 15/40* (2015.01)
(Continued)

(52) U.S. Cl.
CPC .............. *E05F 15/76* (2015.01); *E05F 15/40* (2015.01); *B60N 2/04* (2013.01); *B60N 2/20* (2013.01); *E05Y 2400/44* (2013.01); *E05Y 2400/45* (2013.01); *E05Y 2400/54* (2013.01); *E05Y 2400/818* (2013.01); *E05Y 2400/85* (2013.01); *E05Y 2900/531* (2013.01)

(58) Field of Classification Search
CPC . E05F 15/76; E05F 15/40; E05F 15/77; E05F 15/655; E05F 15/659; B60N 2/04; B60N 2/20; E05Y 2400/44; E05Y 2400/45; E05Y 2400/54; E05Y 2400/818; E05Y 2400/85; E05Y 2900/531
See application file for complete search history.

(56) References Cited

U.S. PATENT DOCUMENTS

| 2014/0022052 A1* | 1/2014 | Lim ................... G07C 9/00309 340/5.61 |
| 2014/0303852 A1* | 10/2014 | Seki ........................ E05F 15/40 701/49 |
| 2019/0121535 A1* | 4/2019 | Tamane ............. G07C 9/00309 |

FOREIGN PATENT DOCUMENTS

| CN | 106452484 A | 2/2017 |
| CN | 107054246 A | 8/2017 |

(Continued)

OTHER PUBLICATIONS

Machine Translation of DE-102015217179-A1 (Year: 2016).*

(Continued)

*Primary Examiner* — Sahar Motazedi
(74) *Attorney, Agent, or Firm* — Oblon, McClelland, Maier & Neustadt, L.L.P.

(57) ABSTRACT

A vehicle door opening/closing control system that sets a communication range inside a vehicle cabin of a vehicle, and detects whether or not a specific mobile terminal is positioned within the communication range; opens and closes a door of the vehicle; and transitions the door to either an open state or a closed state in a case in which the mobile terminal has been detected as being positioned within the communication range.

14 Claims, 11 Drawing Sheets

(51) Int. Cl.
*B60N 2/04* (2006.01)
*B60N 2/20* (2006.01)

(56) References Cited

FOREIGN PATENT DOCUMENTS

| | | | | | |
|---|---|---|---|---|---|
| CN | 107901880 | A | * | 4/2018 | ........... B60R 25/245 |
| CN | 108016382 | A | | 5/2018 | |
| DE | 102015217179 | A1 | * | 5/2016 | ............. E05B 81/77 |
| JP | 2003-206676 | A | | 7/2003 | |
| JP | 2004040245 | A | * | 2/2004 | |
| JP | 2006-225953 | A | | 8/2006 | |
| JP | 2009-235820 | A | | 10/2009 | |
| JP | 2012036569 | A | * | 2/2012 | |
| JP | 2014152510 | A | * | 8/2014 | |
| JP | 2015124530 | A | * | 7/2015 | |
| JP | 2016-82372 | A | | 5/2016 | |
| JP | 2016-88322 | A | | 5/2016 | |
| KR | 20190054618 | A | * | 5/2019 | |

OTHER PUBLICATIONS

Machine Translation of JP-2004040245-A (Year: 2004).*
Machine Translation of JP-2012036569-A (Year: 2012).*
Machine Translation of KR-20190054618-A (Year: 2019).*
Machine Translation of CN107901880A (Year: 2018).*
Machine Translation of JP2014152510A (Year: 2014).*
Machine Translation of JP2015124530A (Year: 2015).*

* cited by examiner

VEHICLE DOOR OPENING/CLOSING CONTROL SYSTEM, VEHICLE DOOR OPENING/CLOSING METHOD AND RECORDING MEDIUM RECORDED WITH DOOR OPENING/CLOSING PROGRAM

CROSS-REFERENCE TO RELATED APPLICATION

This application is based on and claims priority under 35 USC 119 from Japanese Patent Application No. 2020-068437 filed on Apr. 6, 2020, the disclosure of which is incorporated by reference herein.

BACKGROUND

Technical Field

The present disclosure relates to a vehicle door opening/closing control system and a recording medium recorded with a door opening/closing program.

Background Art

Japanese Patent Application Laid-Open (JP-A) No. 2016-82372 discloses technology relating to a vehicle control system. This vehicle control system includes a NFC (near field wireless communication) unit with a communication range at both the inside and the outside a vehicle cabin, an authentication ECU, and an output section. The NFC unit is configured to communicate with a mobile terminal. The authentication ECU determines whether or not the mobile terminal can be authenticated based on identification information transmitted from the mobile terminal. In cases in which the mobile terminal can be authenticated by the authentication ECU and an instruction from the mobile terminal to lock or unlock a vehicle door or the like has been detected, the output section performs output in response to this instruction.

In general, when locking or unlocking a vehicle door, it is common for a door operation section such as a door handle to be operated to perform a door opening or closing operation at around the same time. Thus, after having performed an operation to unlock the door using their mobile terminal while remaining in a seated state, an occupant inside the vehicle cabin then has to change their posture in order to operate the door operation section, which the occupant may find annoying. There is accordingly room for improvement in the background art regarding this point.

SUMMARY

An aspect of the present disclosure is a vehicle door opening/closing control system that includes: a memory; and a processor connected to the memory, the processor being configured to: set a communication range inside a vehicle cabin of a vehicle, and detect whether or not a specific mobile terminal is positioned within the communication range; open and close a door of the vehicle; and transition the door to either an open state or a closed state in a case in which the mobile terminal has been detected as being positioned within the communication range.

DESCRIPTION OF EMBODIMENTS

First Exemplary Embodiment

Figure 1:
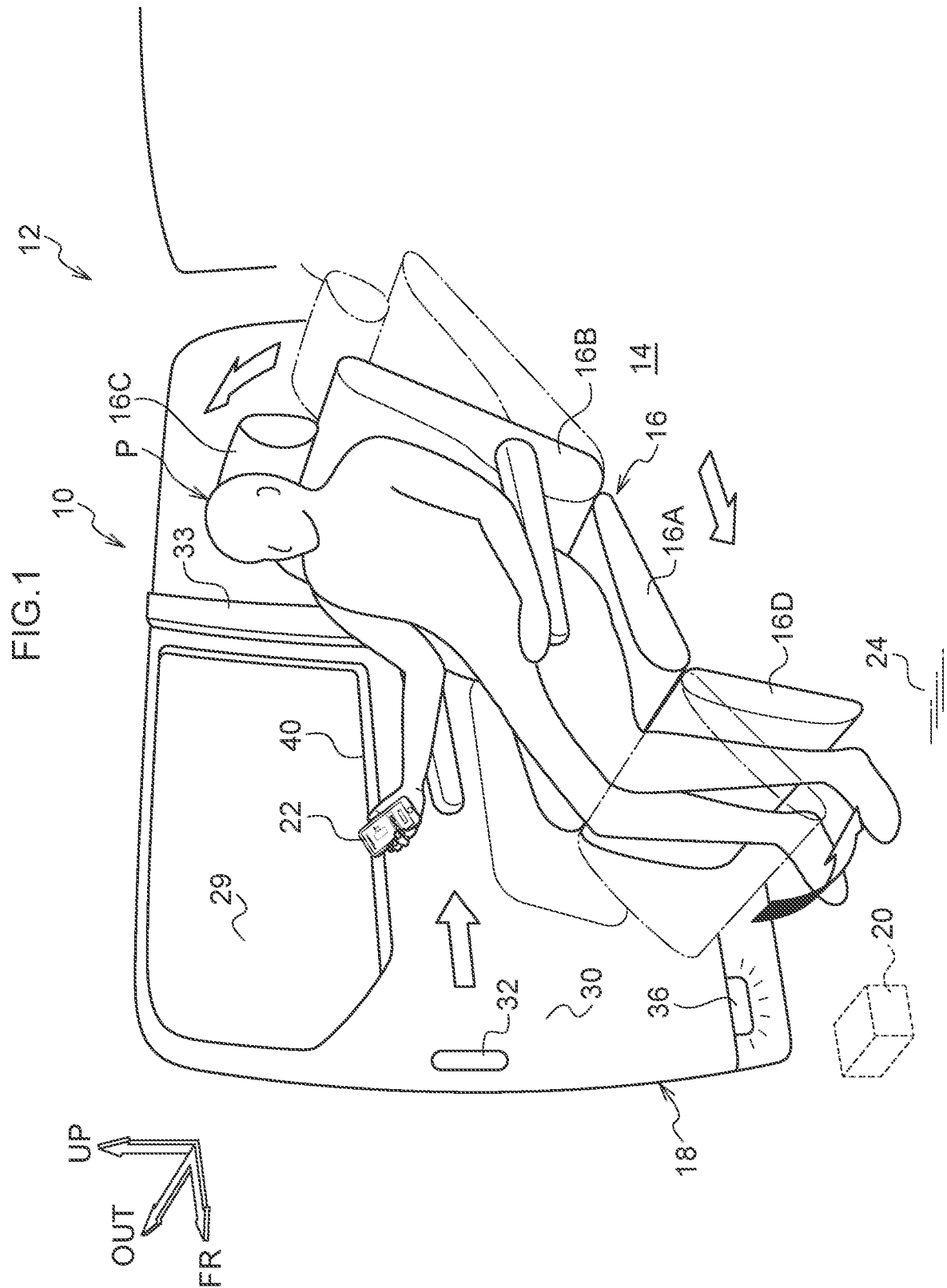
FIG. 1 is a schematic perspective view illustrating the inside of a vehicle cabin of a vehicle including a vehicle door opening/closing control system according to a first exemplary embodiment.

Explanation follows regarding a vehicle door opening/closing control system 10 according to a first exemplary embodiment, with reference to FIG. 1 to FIG. 7. Note that in each of the drawings, the arrow FR, the arrow UP, and the arrow OUT respectively indicate a forward direction, an upward direction, and a vehicle width outward direction of a vehicle, as appropriate. Unless specifically stated otherwise, in the below explanation reference simply to front and rear, up and down, and left and right directions refers to front and rear in a vehicle front-rear direction, up and down in a vehicle vertical direction, and left and right when facing in a vehicle forward direction. The relative dimensions in the drawings may be exaggerated in order to aid explanation, and do not necessarily match the actual proportions.

Hardware Configuration

As illustrated in FIG. 1, a vehicle 12 applied with the vehicle door opening/closing control system 10 is for example an one-box shape type passenger car including plural vehicle seats 16 inside a vehicle cabin 14. As an example, the vehicle seats 16 are arranged in two rows. Side doors 18, serving as doors for entering and exiting at the second row of vehicle seats 16, are provided at two side sections of the vehicle 12. A control device 20 serving as a computer, described later, is also installed in the vehicle 12. An occupant P holding a mobile terminal 22 sits on one of the vehicle seats 16 in the vehicle 12.

Vehicle Seats

Each of the vehicle seats 16 is mounted to a vehicle floor 24 through a seat sliding mechanism. Each of the vehicle seats 16 is configured including a seat cushion 16A for supporting the lumbar region and thighs of a seated occupant P, a seatback 16B for supporting the back of the occupant P, a headrest 16C for supporting the head of the occupant P, and a footrest 16D for supporting the legs of the occupant P. The seat sliding mechanism includes a drive mechanism and is connected to the control device 20. The vehicle seat 16 can be moved along seat slide rails extending along the vehicle front-rear direction based on a signal from the control device 20.

The seatback 16B is connected to a vehicle rear side end portion of the seat cushion 16A through a reclining mechanism. The reclining mechanism includes a drive mechanism and is connected to the control device 20 so as to be capable of communicating therewith. The seatback 16B is capable of reclining and returning from a reclined state about an axial direction along a vehicle width direction based on a signal from the control device 20 (see the single-dotted dashed lines in FIG. 1).

The footrest 16D is connected to a vehicle front side end portion of the seat cushion 16A through a swing mechanism. The swing mechanism includes a drive mechanism and is connected to the control device 20 so as to be capable of communicating therewith. The footrest 16D is capable of swinging with respect to the seat cushion 16A about an axial direction along the vehicle width direction based on a signal from the control device 20 (see the single-dotted dashed lines in FIG. 1).

A standard state of the vehicle seat 16 is configured by a state in which a vehicle front-rear direction position along the seat slide rails, a recline angle of the seatback 16B with respect to vertical, and a position of the footrest 16D respectively facilitate entry and exit of the vehicle by the occupant P. Specifically, the standard state is a state in which the vehicle front-rear direction position of the vehicle seat 16 is a position aligned with a door opening of the corresponding side door 18, the recline angle is at a minimum, and the footrest 16D is stowed away.

Doors

As an example, each of the side doors 18 is a sliding door, and includes a side window 29, a door trim 30, a door operation section 32 configuring a door operation device, a foot illumination section 36, a power sliding door unit 38 (see FIG. 4), and a door frame. The door trim 30 is provided as an interior member at the vehicle cabin inner side of the door frame. The side window 29 is provided inside an opening 40 provided at the vehicle upper side of the door trim 30 of the side door 18.

Figure 3:
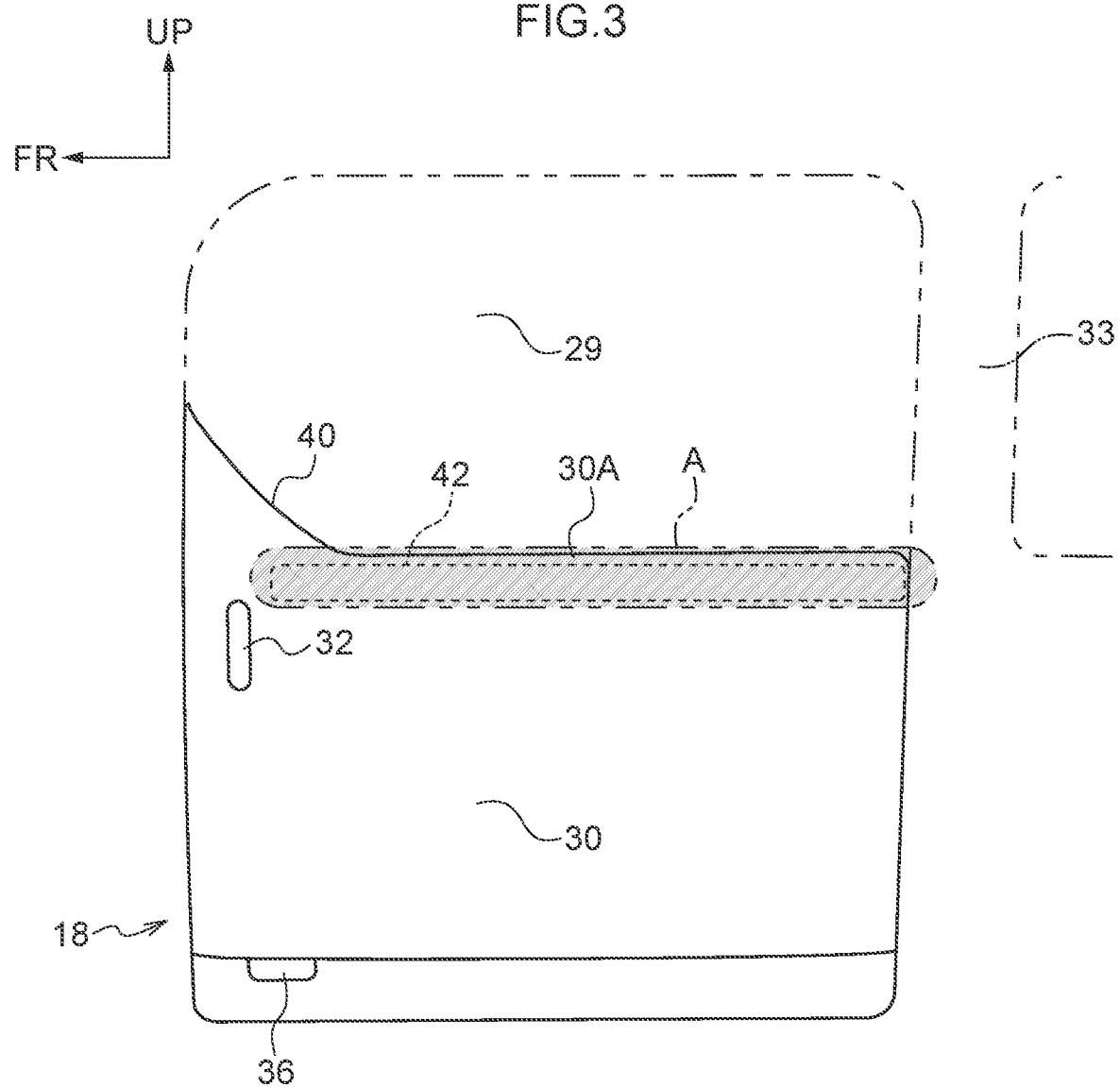
FIG. 3 is a side view illustrating a communication range of a vehicle door opening/closing control system according to the first exemplary embodiment.

As illustrated in FIG. 3, a communication antenna 42 is provided to an upper edge 30A of the door trim 30 that borders a lower end portion of the side window 29. The communication antenna 42 is formed in a substantially rectangular sheet shape with its length direction along the vehicle front-rear direction, and is stuck to a reverse face (namely, a vehicle width direction outer face) of the door trim 30. Specifically, the communication antenna 42 is stuck to the reverse face of the door trim 30 across a range spanning from the vehicle rear side of a position corresponding to the door operation section 32 to a vehicle rear side end portion of the door trim 30. The communication antenna 42 supports NFC, and is set with a communication range A (the shaded area in FIG. 3) inside the vehicle cabin 14 and centered on the upper edge 30A of the door trim 30. Specifically, the communication range A is set across a continuous range spanning from the vehicle rear side of the door operation section 32 to a pillar 33 at the vehicle rear side of the side door 18. Thus, the mobile terminal 22 can be moved to within the communication range A even in cases in which the vehicle seat 16 on which the occupant P is sitting has been slid toward the vehicle rear side. Note that the communication antenna 42 is an NFC tag, and is not connected to a power source or a communication line.

The door operation section 32 is provided at a vehicle front side end portion of the door trim 30 near to the upper edge 30A, such that the door operation section 32 can be operated even when the side door 18 is in an open state. The door operation section 32 is an inner door handle. As an example, a locked state of a latch mechanism of the side door 18 is released by pulling the door operation section 32 toward the vehicle rear side, after which the power sliding door unit 38 causes the side door 18 to transition to the open state.

The power sliding door unit 38 is connected to the door operation section 32 and the control device 20 so as to be capable of communicating therewith. The side door 18 is moved to the open state or a closed state by a drive mechanism internally provided to the power sliding door unit 38. The power sliding door unit 38 is also capable of causing the latch mechanism of the side door 18 to transition to one out of the locked state or a lock-released state.

The foot illumination section 36 is provided at the vehicle front side and vehicle lower side of the door trim 30, and is connected to the control device 20 so as to be capable of communicating therewith. The foot illumination section 36 can be illuminated based on a signal from the control device 20.

Control Device

Figure 4:
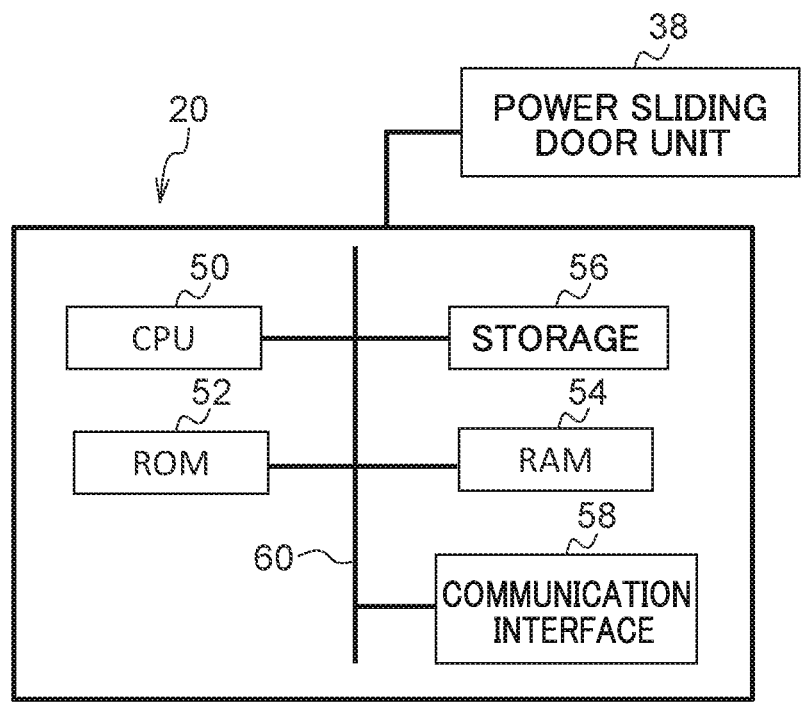
FIG. 4 is a block diagram illustrating a hardware configuration of onboard devices in a vehicle door opening/closing control system according to the first exemplary embodiment.

As illustrated in FIG. 4, the control device 20 is configured including a central processing unit (CPU) 50 serving as an example of an internally provided hardware processor, read only memory (ROM) 52, random access memory (RAM) 54, storage 56, and a communication interface 58. The respective configurations are connected together so as to be capable of communicating with each other through a bus 60.

The CPU 50 is a central processing unit that executes various programs and controls various sections. Namely, the CPU 50 reads a program from the ROM 52 or the storage 56, and executes the program using the RAM 54 as a workspace. The CPU 50 controls the respective configurations and performs various computation processing based on the program recorded in the ROM 52 or the storage 56. In the present exemplary embodiment, a door opening/closing program to open and close the side doors 18 using the corresponding power sliding door units 38 is held in the ROM 52 or the storage 56.

The ROM 52 holds various programs and various data. The RAM 54 acts as a workspace to temporarily store programs or data. The storage 56 is configured by a hard disk drive (HDD) or a solid state drive (SSD), and holds various programs including an operating system, as well as various data.

The communication interface 58 is an interface for communicating with other devices. In the present exemplary embodiment, the communication interface has a function of performing wireless communication according to various communication protocols.

Mobile Terminal

Figure 5:
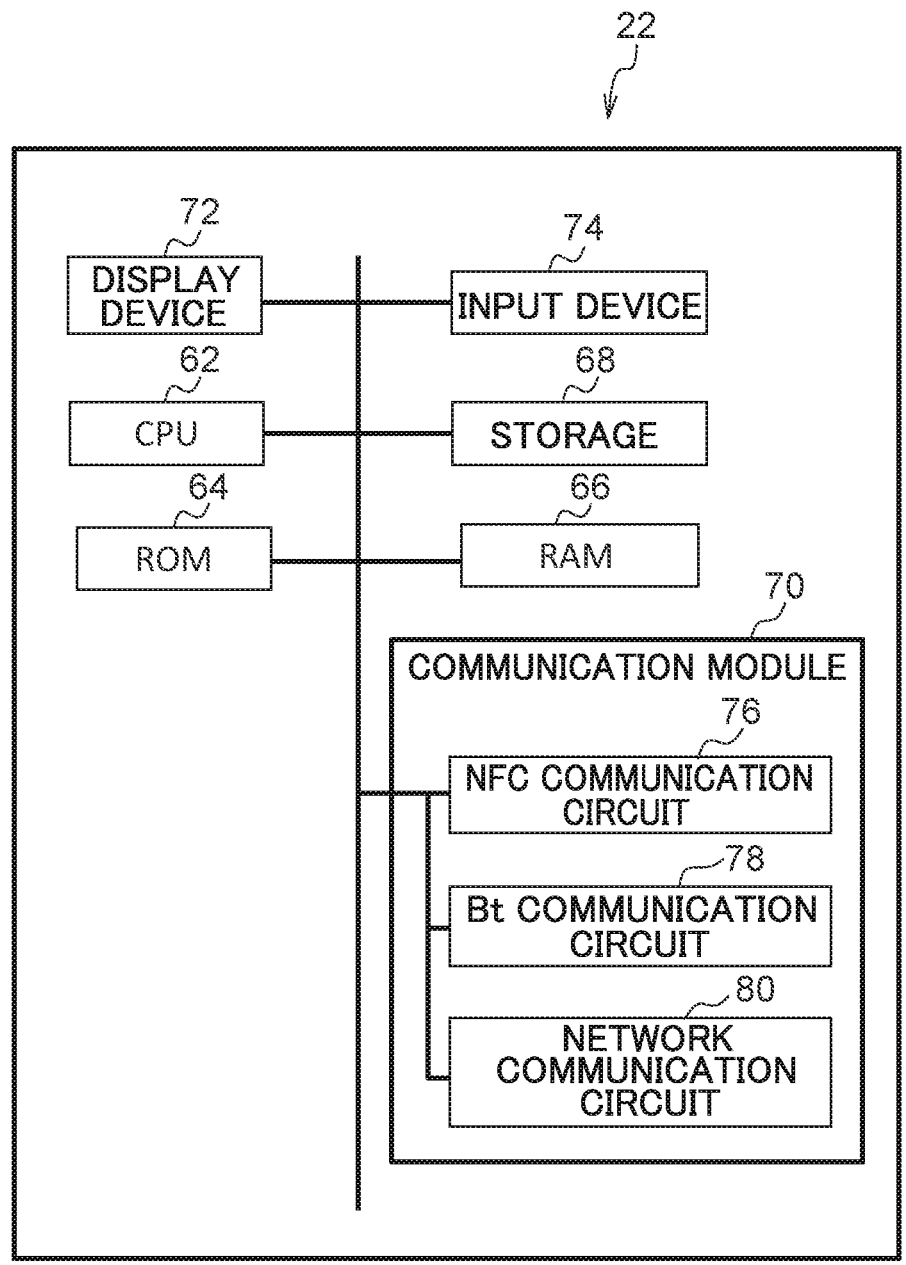
FIG. 5 is a block diagram illustrating a hardware configuration of a mobile terminal in a vehicle door opening/closing control system according to the first exemplary embodiment.

The mobile terminal 22 (see FIG. 1) is a computer held by the occupant P seated on the corresponding vehicle seat 16, and is configured by a smartphone, a mobile telephone, a tablet terminal, or the like. As illustrated in FIG. 5, the mobile terminal 22 includes a CPU 62 serving as an example of a hardware processor, ROM 64, RAM 66, storage 68, a communication module 70, a display device 72, an input device 74, and the like. Similarly to the CPU 50, the CPU 62 is a central processing unit that executes various programs and controls various sections. The CPU 62 controls the respective configurations and performs various computation processing based on a program recorded in the ROM 64 or the storage 68. In the present exemplary embodiment, a door opening/closing program to open and close the side doors 18 using the corresponding power sliding door units 38 is held in the ROM 64 or the storage 68.

The ROM 64 holds various programs and various data. The RAM 66 acts as a workspace to temporarily store programs or data. The storage 68 is configured by a SSD as an example, and holds various programs including an operating system, as well as various data.

The communication module 70 is configured including an NFC communication circuit 76, a Bt communication circuit 78, and a network communication circuit 80. The NFC communication circuit 76 performs wireless communication with the communication antenna 42 (see FIG. 3) using an NFC communication method conforming to an NFC communication protocol. This enables determination to be made as to whether or not the mobile terminal 22 is positioned within the communication range A of the communication antenna 42.

The Bt communication circuit 78 performs wireless communication with the communication interface 58 of the control device 20 using a communication method conforming to a Bluetooth (registered trademark) protocol as an example. This enables the transmission of information such as an operation input to the mobile terminal 22 to the control device 20, and enables the receipt of various information from the control device 20 by the mobile terminal 22.

The network communication circuit 80 performs wireless communication according to various communication protocols in order to access mobile communication services such as 3G and LTE communication network lines, and access communication networks such as the internet.

The display device 72 is a device that displays information, and for example includes a liquid crystal display or an organic EL display. The input device 74 is a device allowing the occupant P to input the mobile terminal 22 with instructions or information, and for example includes at least one out of a touch sensor, a keypad, or buttons. In the present exemplary embodiment, the mobile terminal 22 includes a touch screen. When the occupant P touches a user interface image (such as a button or an icon; see FIG. 2) displayed on the display device 72, an instruction is input to the mobile terminal 22.

Functional Configuration

When the door opening/closing program is executed, the vehicle door opening/closing control system 10 uses the above hardware resources to implement various functionality. Explanation follows regarding functional configurations implemented by the vehicle door opening/closing control system 10.

Figure 6:
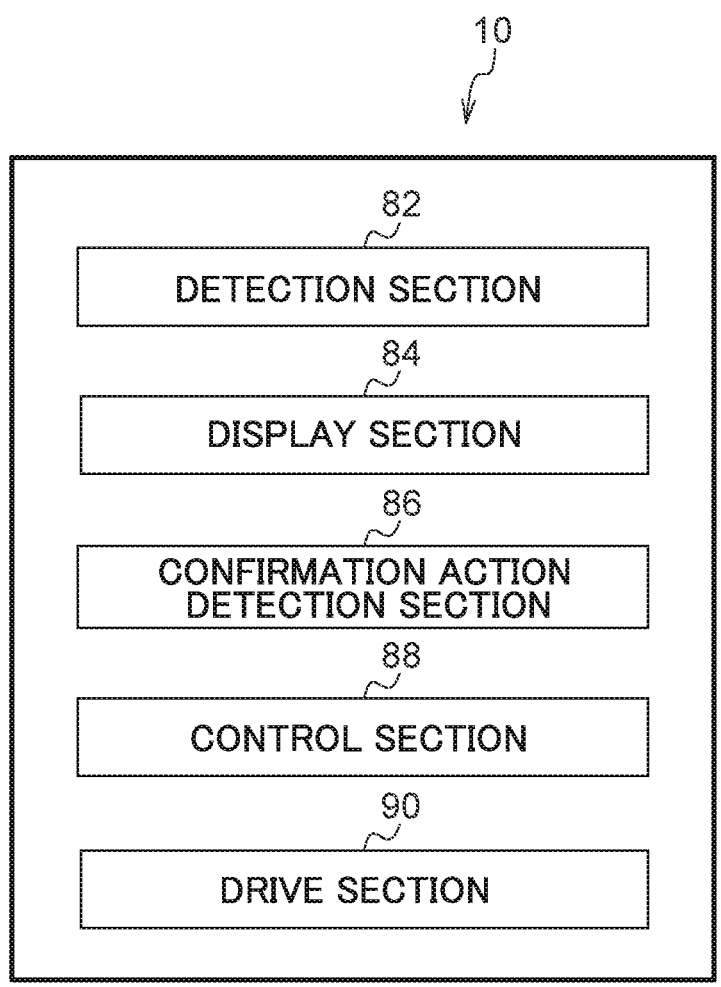
FIG. 6 is a block diagram illustrating functional configurations of a vehicle door opening/closing control system according to the first exemplary embodiment.

FIG. 6 is a block diagram illustrating an example of functional configurations of the vehicle door opening/closing control system 10.

As illustrated in FIG. 6, the vehicle door opening/closing control system 10 includes a detection section 82, a display section 84 serving as a display device, a confirmation action detection section 86, a control section 88, and a drive section 90 as functional configurations. The respective functional configurations are implemented by the CPUs 50, 62 of the control device 20 and the mobile terminal 22 reading and executing the door opening/closing programs stored in the respective ROM 52, 64 or storage 56, 68 (see FIG. 4 and FIG. 5).

The detection section 82 detects whether or not the mobile terminal 22 is positioned within the communication range A (see FIG. 3) of the communication antenna 42 provided to the door trim 30. In cases in which the mobile terminal 22 is positioned within the communication range A as a result of the occupant P contacting or waving the mobile terminal 22 against the upper edge 30A of the door trim 30 (see FIG. 1), detection information is transmitted to the display section 84 and the confirmation action detection section 86.

Figure 2:
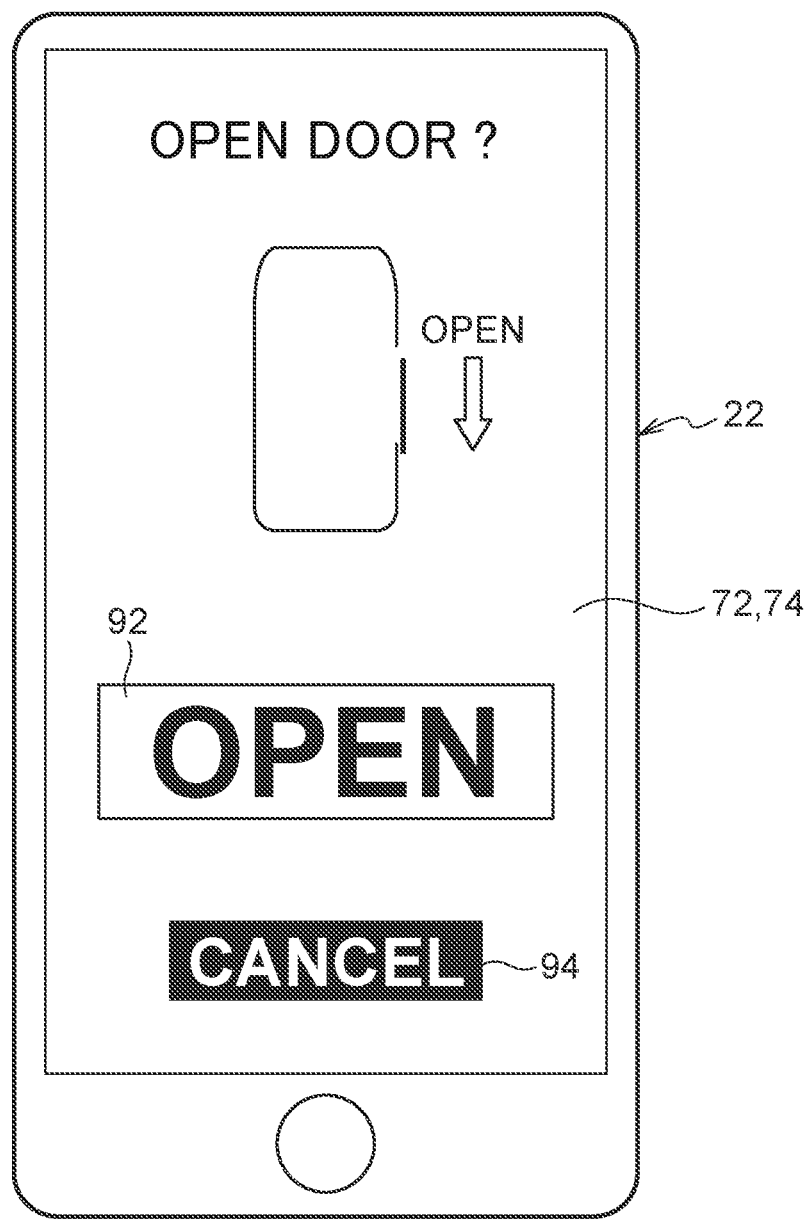
FIG. 2 is a schematic view illustrating an example of a display screen of a mobile terminal in a vehicle door opening/closing control system according to the first exemplary embodiment.

On receiving the detection information, the display section 84 uses display on the display device 72 of the mobile terminal 22 to confirm whether or not to open or close the side door 18 on the side where the mobile terminal 22 has been detected. Specifically, information regarding whether the side door 18 is currently in the open or the closed state is acquired, and if the detection information is received when the side door 18 is in the closed state, display content is displayed on the display device 72 as illustrated in FIG. 2 to confirm whether or not to open the side door 18. On the other hand, if the detection information is received when the side door 18 is in the open state, display content to confirm whether or not to close the side door 18 is displayed on the display device 72.

The confirmation action detection section 86 detects an operation to accept the display content displayed on the display section 84 as a specific operation input to the mobile terminal 22. In the present exemplary embodiment, in cases in which display content to confirm whether or not to open the side door 18 is displayed on the display device 72 of the mobile terminal 22, an operation to accept this (hereafter simply referred to as an "acceptance operation") is detected if the occupant P presses an OPEN button 92 (performs input to the input device 74) associated with opening of the side door 18. However, if the occupant P presses a CANCEL button 94, the confirmation action detection section 86 detects that the display content has not been accepted. In cases in which display content to confirm whether or not to close the side door 18 is displayed on the display device 72 of the mobile terminal 22, an acceptance operation is detected if the occupant P presses a CLOSE button (performs input to the input device 74) associated with closing of the side door 18. In cases in which such an acceptance operation has been detected, the confirmation action detection section 86 transmits information to the control section 88 to indicate that the acceptance operation has been performed.

As illustrated in FIG. 6, on receiving the information indicating that the acceptance operation has been performed, the control section 88 transmits an actuation signal to the drive section 90 to either open or close the side door 18 according to the content of the acceptance operation. Namely, in cases in which the above-described OPEN button 92 (see FIG. 2) has been pressed, an actuation signal is transmitted to the drive section 90 so as to open the side door 18 on the side where the mobile terminal 22 has been detected. When the CLOSE button has been pressed, an actuation signal is transmitted to the drive section 90 so as to close the side door 18 on the side where the mobile terminal 22 has been detected.

The drive section 90 actuates the power sliding door unit 38 to open or close the side door 18 based on the actuation signal received from the control section 88.

Processing Flow

Figure 7:
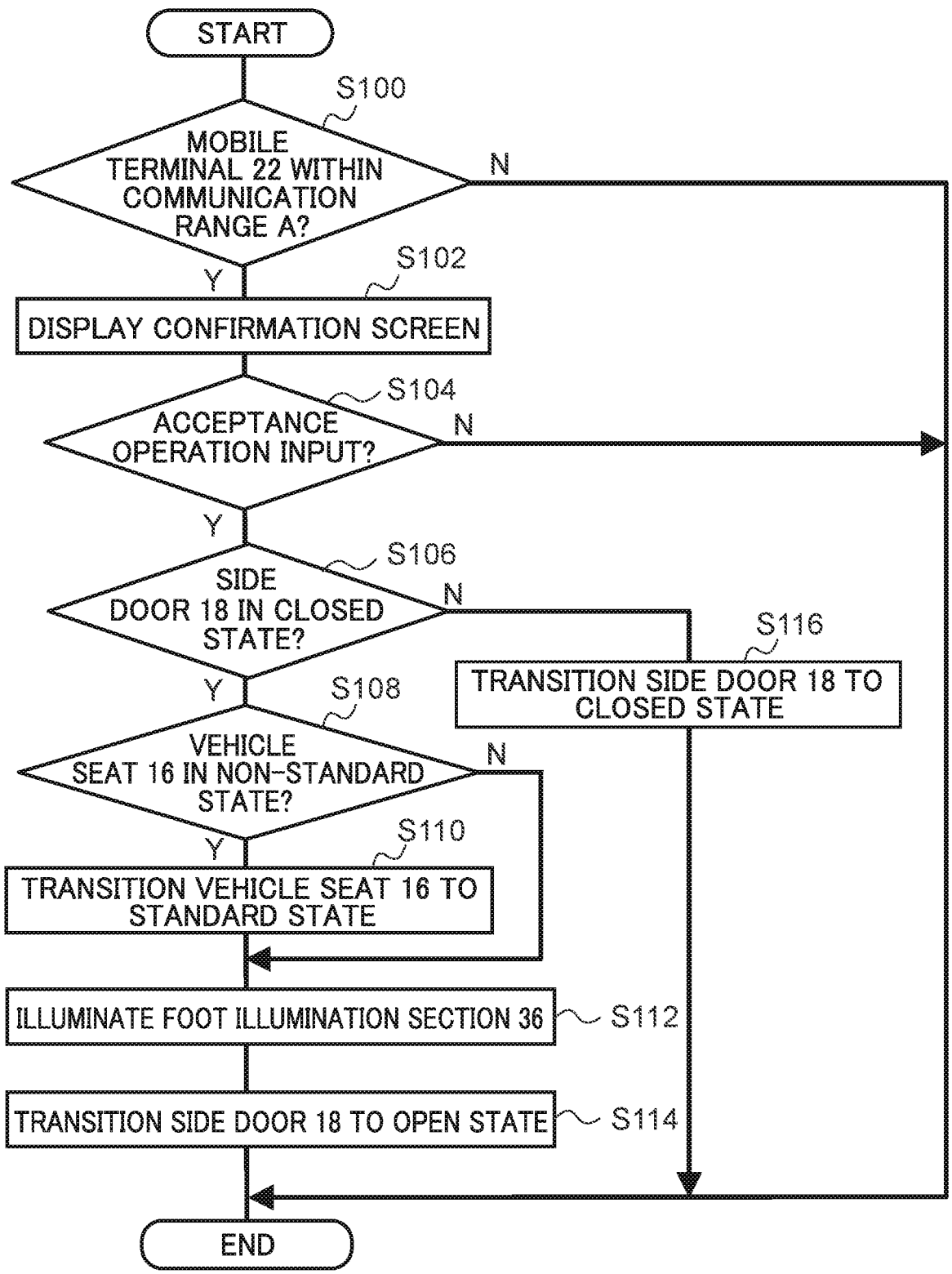
FIG. 7 is a flowchart illustrating a flow of processing of a vehicle door opening/closing control system according to the first exemplary embodiment.

Next, explanation follows regarding operation of the vehicle door opening/closing control system 10. FIG. 7 is a flowchart illustrating a flow of actions performed by the vehicle door opening/closing control system 10. The CPUs 50, 62 read the door opening/closing programs from the respective ROM 52, 64 or storage 56, 68 and expand and execute the programs in the respective RAM 54, 66 to perform opening or closing of the corresponding side door 18.

The CPUs 50, 62 determine whether or not the mobile terminal 22 is positioned within the communication range A (step S100). In cases in which the mobile terminal 22 is not positioned within the communication range A (step S100: NO), the CPUs 50, 62 end the processing based on the door opening/closing program. On the other hand, in cases in which the mobile terminal 22 is positioned within the communication range A (step S100: YES), the CPUs 50, 62 display on the display device 72 of the mobile terminal 22 display content to confirm whether or not to open or close the side door 18 (step S102).

The CPUs 50, 62 then determine whether or not the acceptance operation has been input to the mobile terminal 22 (step S104). In cases in which the acceptance operation has not been input to the mobile terminal 22 (step S104: NO), the CPUs 50, 62 end the processing based on the door opening/closing program. On the other hand, in cases in which the acceptance operation has been input to the mobile terminal 22 (step S104: YES), the CPUs 50, 62 determine whether or not the side door 18 on the side where the mobile terminal 22 has been detected is currently in the closed state (step S106).

In cases in which the side door 18 on the side where the mobile terminal 22 has been detected is currently in the closed state (step S106: YES), the CPUs 50, 62 then determine whether or not the vehicle seat 16 next to the side door 18 on the side where the mobile terminal 22 has been detected is in a state other than the standard state (step S108). Namely, the CPUs 50, 62 determine whether or not this vehicle seat 16 is in a state (hereafter simply referred to as a non-standard state) corresponding to at least one out of a reclined state, a state slid away from the standard state position along the vehicle front-rear direction, or a state in which the footrest 16D is being used.

In cases in which the vehicle seat 16 is not in a non-standard state (step S108: NO), the CPUs 50, 62 transition to the processing of step S112, described below. On the other hand, in cases in which the vehicle seat 16 is in a non-standard state (step S108: YES), the CPUs 50, 62 cause the vehicle seat 16 to transition to the standard state (step S110).

The CPUs 50, 62 then illuminate the foot illumination section 36 of the side door 18 on the side where the mobile terminal 22 has been detected (step S112), and operate the power sliding door unit 38 so as to transition the side door 18 on the side where the mobile terminal 22 has been detected to the open state (step S114). The CPUs 50, 62 then end the processing based on the door opening/closing program.

In cases in which the side door 18 on the side where the mobile terminal 22 has been detected is currently in the open state (step S106: NO), the CPUs 50, 62 operate the power sliding door unit 38 so as to transition the side door 18 on the side where the mobile terminal 22 has been detected to the closed state (step S116), and then end the processing based on the door opening/closing program.

Operation and Advantageous Effects of First Exemplary Embodiment

Next, explanation follows regarding operation and advantageous effects of the present exemplary embodiment.

As illustrated in FIG. 6, the vehicle door opening/closing control system 10 of the present exemplary embodiment includes the detection section 82, the drive section 90, and the control section 88. The detection section 82 is set for the communication range A (see FIG. 3) inside the vehicle cabin 14, and detects whether or not the specific mobile terminal 22 is positioned within the communication range A. The drive section 90 opens and closes the side doors 18 (see FIG. 1) of the vehicle 12. In cases in which the detection section 82 has detected that the mobile terminal 22 is positioned within the communication range A, the control section 88 controls the drive section 90 such that the corresponding side door 18 transitions to either the open state or the closed state. The occupant P sitting on one of the vehicle seats 16 inside the vehicle cabin 14 is thereby able to open and close the corresponding side door 18 by moving the mobile terminal 22 to within the communication range A, thereby allowing the occupant P to open or close the side door 18 without greatly changing their seated posture. This enables the convenience of operation to be improved.

The communication range A is set at a vehicle cabin inner face of the door trim 30 that covers the side door 18 from the inside of the vehicle cabin 14, and at the vehicle rear side of the door operation section 32 that is used to input an operation to open or close the side door 18. Namely, when opening or closing the side door 18 from inside the vehicle cabin 14, the occupant P generally directs their attention toward the side door 18. Thus, by setting the communication range A at the vehicle cabin inner face of the door trim 30, the occupant P is able to perform an intuitive operation to move the mobile terminal 22 to within the communication range A. Moreover, by setting the communication range A at the vehicle rear side of the door operation section 32, the occupant P in the seated state is able to open and close the side door 18 without having to reach out for the door operation section 32, which is generally located toward the vehicle front side of the side door 18. This enables the convenience of operation to be further improved.

Furthermore, the communication range A is set across a continuous range spanning from the vehicle rear side of the door operation section 32 to the pillar 33 positioned at the vehicle rear side of the side door 18. This enables the occupant P seated on the vehicle seat 16 inside the vehicle cabin 14 to easily move the mobile terminal 22 to within the communication range A, even in a state in which the occupant P has slid the vehicle seat 16 toward the vehicle rear side. Namely, the operation to open or close the side door 18 can be easily performed by the occupant P from various seated postures. This enables the convenience of operation to be improved for a variety of seat positions.

Furthermore, the control section 88 is connected to the confirmation action detection section 86. The confirmation action detection section 86 detects a specific operation input to the mobile terminal 22. The control section 88 controls the drive section 90 to cause the corresponding side door 18 to transition to either the open state or the closed state in cases in which the mobile terminal 22 has been detected to be positioned within the communication range A and the confirmation action detection section 86 has also detected the specific operation. The side door 18 is therefore not opened or closed in cases in which the specific operation has not been input, even if the mobile terminal 22 has been moved to within the communication range A. This enables unintentional opening and closing of the door to be suppressed.

The confirmation action detection section 86 detects as the specific operation an operation by the occupant P inside the vehicle cabin 14 to accept specific display content displayed on the display section 84 that enables viewing of display content. Thus, even if the mobile terminal 22 has been moved to within the communication range A, the corresponding side door 18 is not opened or closed unless the acceptance operation has been performed, thereby enabling unintentional opening and closing of the side door 18 to be suppressed. This enables mistaken operation to be suppressed.

Furthermore, the vehicle seat 16 is capable of at least one out of movement along the vehicle front-rear direction or reclining of the seatback 16B. The communication range A is set to a range that accommodates at least one out of a front-rear direction movement range of the vehicle seat 16 or a reclining range of the seatback 16B. Namely, this allows the occupant P sitting on the vehicle seat 16 to perform the operation to open or close the corresponding side door 18 without greatly shifting from their seated posture, even in a state in which the vehicle seat 16 has been slid or reclined. This enables the convenience of operation to be improved for a various seat positions.

Furthermore, in the control device 20 and the mobile terminal 22 that execute the program, the detection section 82 detects when the mobile terminal 22 is positioned within the communication range A, and the drive section 90 is controlled such that the corresponding side door 18 transitions either the open state or the closed state in cases in which the confirmation action detection section 86 has detected input of the specific operation to the mobile terminal 22. This allows the occupant P sitting on the vehicle seat 16 inside the vehicle cabin 14 to open and close the corresponding side door 18 by moving the mobile terminal 22 to within the communication range A and then inputting the specific operation to the mobile terminal 22. This allows the occupant P to open and close the side door 18 without greatly changing their seated posture. This thereby enables the convenience of operation to be improved.

Second Exemplary Embodiment

Next, explanation follows regarding a vehicle door opening/closing control system according to a second exemplary embodiment of the present disclosure, with reference to FIG. 8 to FIG. 11. Note that configurations that are the same as those in the first exemplary embodiment described above are allocated the same reference numerals, and explanation thereof is omitted.

A vehicle door opening/closing control system 100 according to the second exemplary embodiment has basically the same configuration as the first exemplary embodiment, but includes a vehicle exterior detection section 102 (see FIG. 10) that detects potential hazards present in the surroundings of a vehicle 104.

Hardware Configuration

Figure 8:
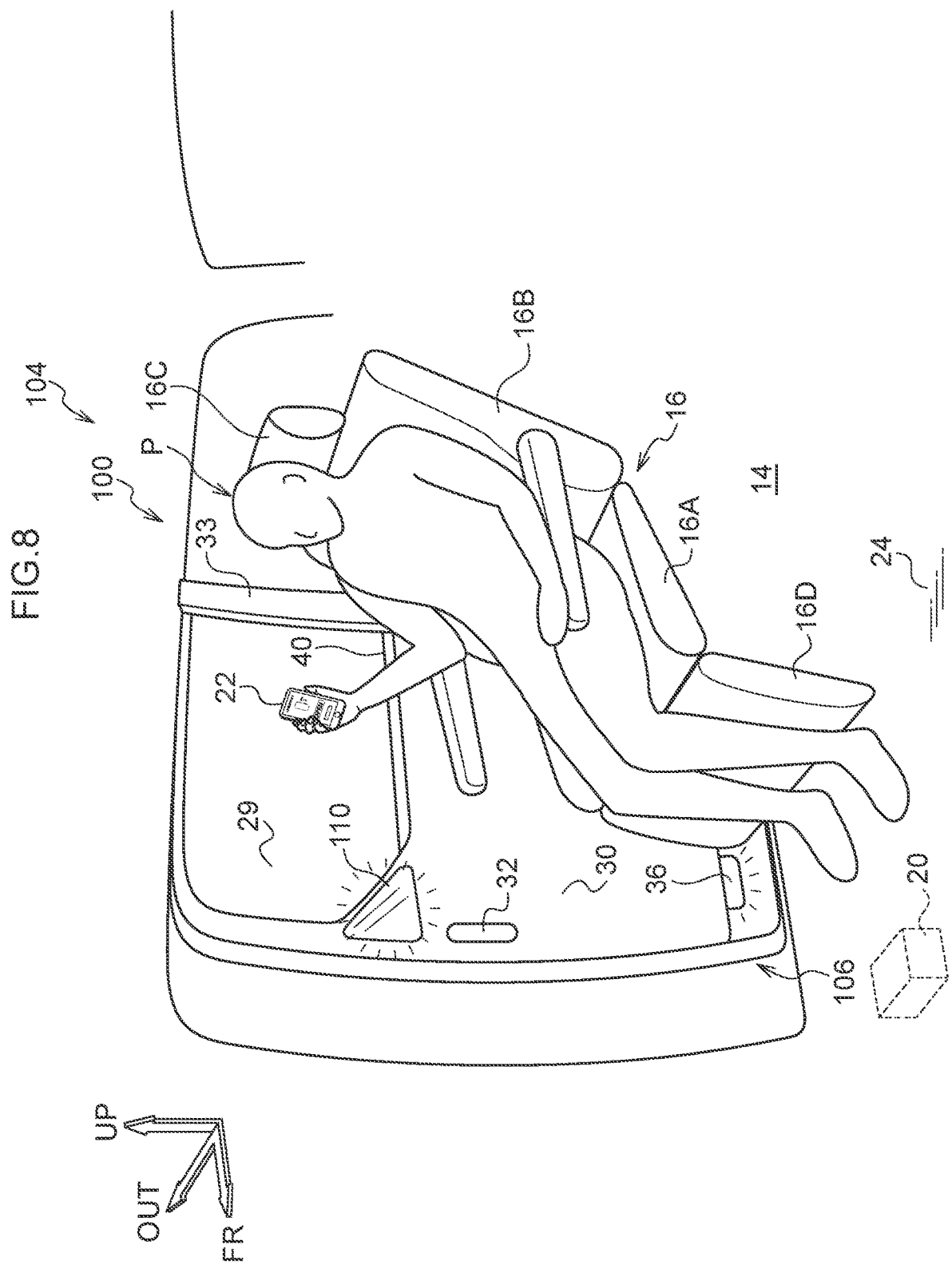
FIG. 8 is a schematic perspective view illustrating a vehicle door opening/closing control system according to a second exemplary embodiment in a state in which a potential hazard has been detected.

Namely, as illustrated in FIG. 8, the vehicle 104 applied with the vehicle door opening/closing control system 100 is an one-box shape type passenger car including the plural vehicle seats 16 inside the vehicle cabin 14, similarly to in the first exemplary embodiment. Side doors 106, serving as doors for entering and exiting at the second row of vehicle seats 16, are provided at two side sections of the vehicle 104. The vehicle 104 is also provided with a peripheral detection sensor 108, described later.

Doors

Figure 9:
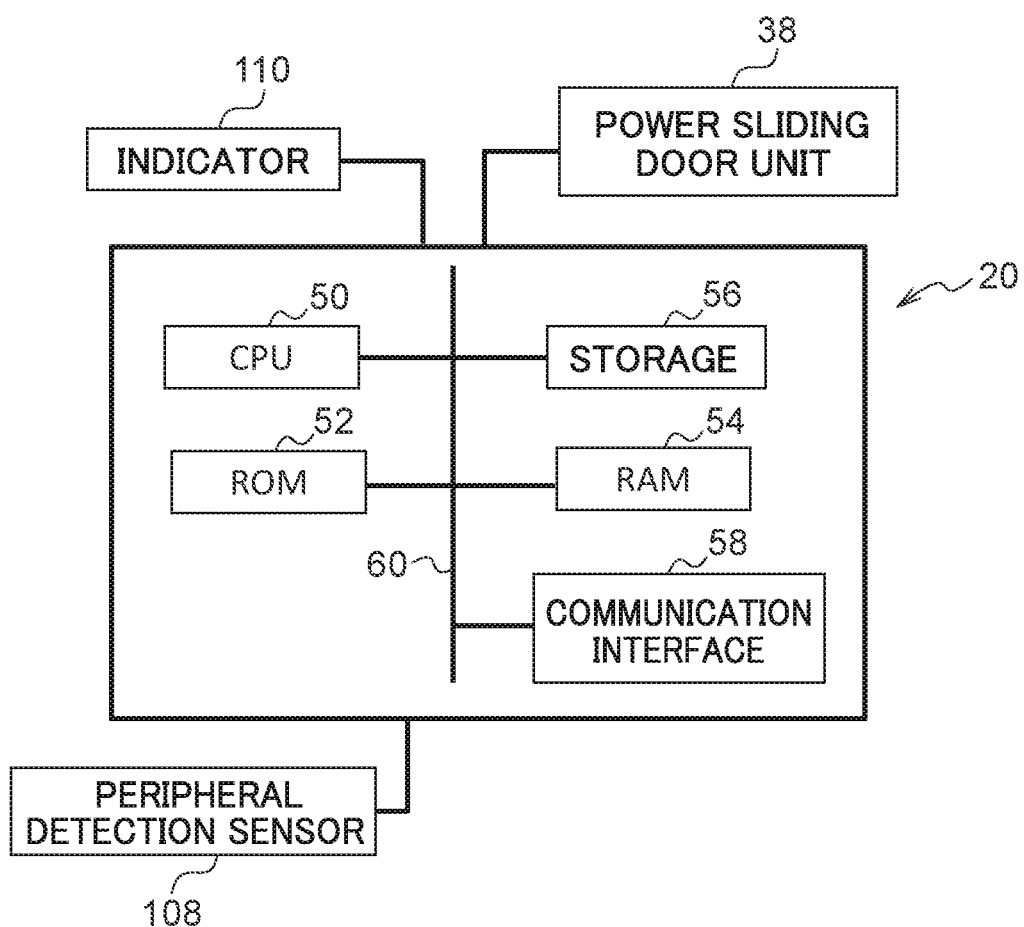
FIG. 9 is a block diagram illustrating a hardware configuration of onboard devices in a vehicle door opening/closing control system according to the second exemplary embodiment.

The side doors 106 have basically the same configuration as the side doors 18 of the first exemplary embodiment, and each include the side window 29, the door trim 30, the door operation section 32, the foot illumination section 36, an indicator 110, a door frame, and the power sliding door unit 38. The indicator 110 is provided at a position that is easily seen by an occupant P sitting on the corresponding vehicle seat 16. In the present exemplary embodiment, the indicator 110 is provided at the vehicle front side and vehicle upper side of the door trim 30, and internally houses a light emitting body. As illustrated in FIG. 9, the indicator 110 is connected to the control device 20 so as to be capable of communicating therewith, and can be illuminated based on a signal from the control device 20. Note that as an example, the indicator 110 can be illuminated in red so as to draw the attention of the occupant P.

Peripheral Detection Sensor

The peripheral detection sensor 108 is a sensor that detects a situation peripheral to the periphery of the vehicle 104, and is for example configured including laser radar, an ultrasound sensor, millimeter-wave radar, or the like. The peripheral detection sensor 108 may be configured by a combination of plural sensors. The peripheral detection sensor 108 is connected to the control device 20 so as to be capable of communicating therewith.

Functional Configuration

When the above-described door opening/closing program is executed, the vehicle door opening/closing control system 100 uses the above-described hardware resources to implement various functionality. Explanation follows regarding functional configurations implemented by the vehicle door opening/closing control system 100.

Figure 10:
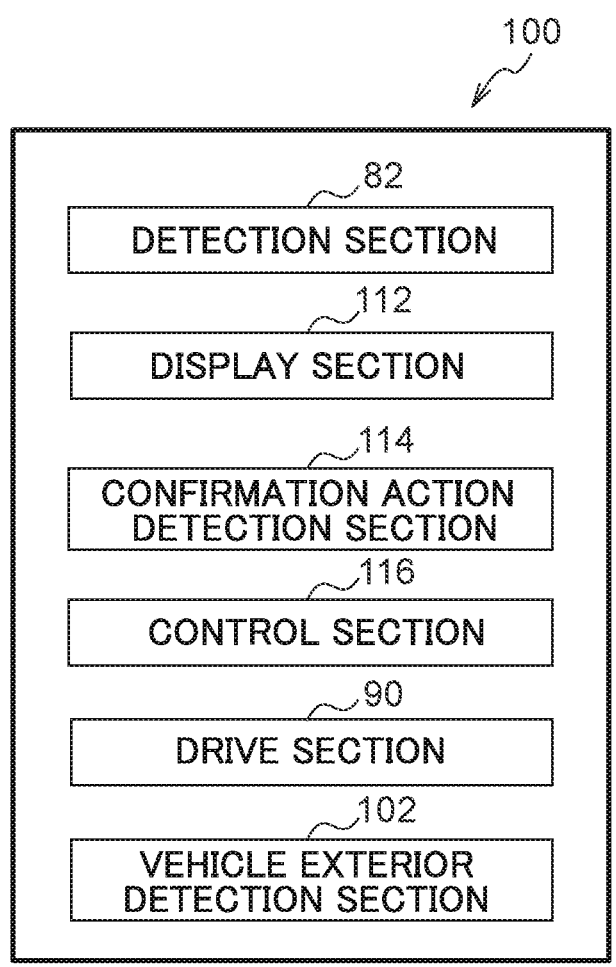
FIG. 10 is a block diagram illustrating functional configurations of a vehicle door opening/closing control system according to the second exemplary embodiment.

FIG. 10 is a block diagram illustrating an example of functional configurations of the vehicle door opening/closing control system 100.

As illustrated in FIG. 10, the vehicle door opening/closing control system 100 includes the detection section 82, a display section 112, a confirmation action detection section 114, a control section 116, the drive section 90, and the vehicle exterior detection section 102 as functional configurations. The respective functional configurations are implemented by the CPUs 50, 62 of the control device 20 and the mobile terminal 22 reading and executing the door opening/closing programs stored in the respective ROM 52, 64 or storage 56, 68 (see FIG. 4 and FIG. 5).

On receiving the detection information from the detection section 82, the confirmation action detection section 114 determines whether or not the mobile terminal 22 has been moved from outside the communication range A to within the communication range A plural times within a prescribed duration. Specifically, an action in which the occupant P waves the mobile terminal 22 past the upper edge 30A of the door trim 30 plural times (taps the mobile terminal 22 against the upper edge 30A plural times) (hereafter simply referred to as plural taps) is detected. When plural taps have been detected, the confirmation action detection section 114 considers an acceptance operation to have been performed, and transmits information that the acceptance operation has been performed to the control section 116.

The vehicle exterior detection section 102 receives information regarding the situation in the surroundings of the vehicle 104 from the peripheral detection sensor 108, and thereby identifies the existence of any potential hazards, as well as the type, position, and so on of such potential hazards. In cases in which the vehicle exterior detection section 102 detects a potential hazard near to or in the surroundings of the side door 106 on the side where the mobile terminal 22 has been detected, the detection of this potential hazard is transmitted to the control section 116.

On receiving information that the acceptance operation has been performed, the control section 116 transmits an actuation signal to the drive section 90 so as to open or close the side door 106 according to the content of the acceptance operation. Namely, when the occupant P has performed plural taps with the mobile terminal 22 when the corresponding side door 106 is in the closed state, an actuation signal is transmitted to the drive section 90 so as to open the side door 106 on the side where the plural taps were performed. Alternatively, when the occupant P has performed plural taps with the mobile terminal 22 when the side door 106 is in the open state, an actuation signal is transmitted to the drive section 90 so as to close the side door 106 on the side where the plural taps were performed.

If the control section 116 receives information that a potential hazard has been detected by the vehicle exterior detection section 102 as the side door 106 transitions from the closed state to the open state, the control section 116 transmits a signal to the drive section 90 to as to stop transition of the side door 106 to the open state, and transmits a signal to the display section 112 so as to display information indicating that the opening action of the side door 106 has been stopped.

On receiving the information that the opening action of the side door 106 has been stopped from the control section 116, the display section 112 illuminates the indicator 110 in red. The occupant P is thereby notified that the opening action of the side door 106 has been stopped as a result of detection of a potential hazard.

Processing Flow

Figure 11:
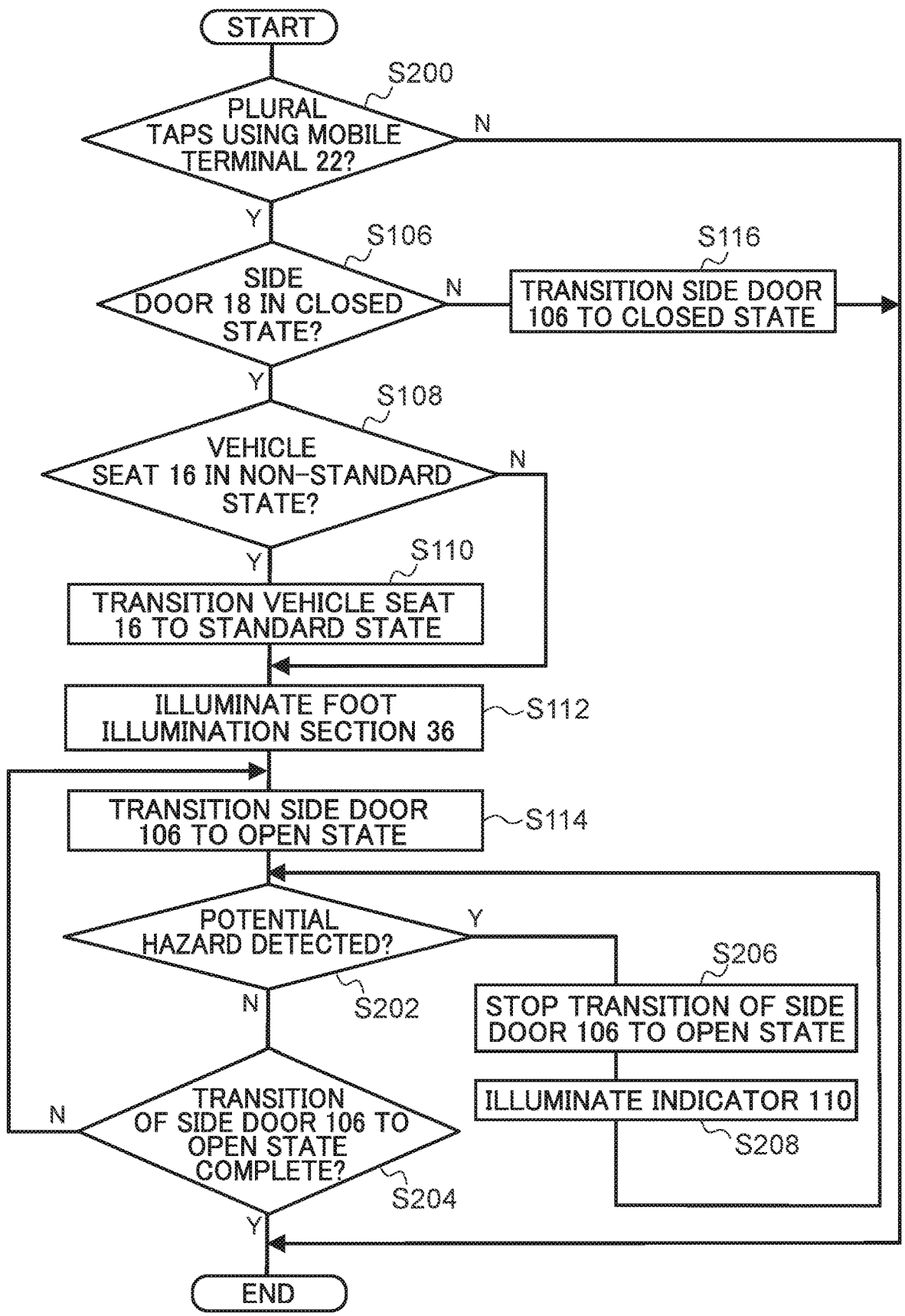
FIG. 11 is a flowchart illustrating a flow of processing of a vehicle door opening/closing control system according to the second exemplary embodiment.

Next, explanation follows regarding operation of the vehicle door opening/closing control system 100. FIG. 11 is a flowchart illustrating a flow of actions performed by the vehicle door opening/closing control system 100. The CPUs 50, 62 read the door opening/closing programs from the respective ROM 52, 64 or storage 56, 68 and expand and execute the programs in the respective RAM 54, 66 to perform opening or closing of the corresponding side door 106. Note that processing that is the same as that in the first exemplary embodiment is allocated the same reference numerals, and explanation thereof is omitted.

The CPUs 50, 62 determine whether or not plural taps have been performed using the mobile terminal 22 (step S200). In cases in which plural taps have not been performed using the mobile terminal 22 (step S200: NO), the CPUs 50, 62 end the processing based on the door opening/closing program. On the other hand, in cases in which plural taps have been performed using the mobile terminal 22 (step S200: YES), the CPUs 50, 62 deem an acceptance operation to have been input, and transition to the processing of step S106.

After the processing of step S114, the CPUs 50, 62 determine whether or not a potential hazard is present in the surroundings of the side door 106 on the side where the mobile terminal 22 has been detected (step S202). In cases in which a potential hazard has not been detected (step S202: NO), the CPUs 50, 62 determine whether or not the transition of the side door 106 to the open state is complete (step S204). In cases in which the transition of the side door 106 to the open state is complete (step S204: YES), the CPUs 50, 62 end the processing based on the door opening/closing program. On the other hand, in cases in which the transition of the side door 106 to the open state is not yet complete (step S204: NO), the CPUs 50, 62 return to the processing of step S114.

In cases in which a potential hazard has been detected (step S202: YES), the CPUs 50, 62 stop the transition of the side door 106 to the open state using the power sliding door unit 38 (step S206), and illuminate the indicator 110 (step S208). The CPUs 50, 62 then return to the processing of step S202.

Operation and Advantageous Effects of Second Exemplary Embodiment

Next, explanation follows regarding operation and advantageous effects of the second exemplary embodiment.

With the exception of the fact that the vehicle exterior detection section 102 (see FIG. 10) detects potential hazards present in the surroundings of the vehicle 104, the above configuration is similarly configured to the vehicle door opening/closing control system 10 of the first exemplary embodiment, and so obtains similar advantageous effects to those of the first exemplary embodiment. Moreover, as the specific operation, the confirmation action detection section 114 detects an operation in which the mobile terminal 22 is moved from outside the communication range A to within the communication range A plural times within a prescribed duration. Thus, when there is no intent to open or close the corresponding side door 106, even if the mobile terminal 22 moves to within the communication range A the side door 106 is not opened or closed as long as the mobile terminal 22 is not moved from outside the communication range A to within the communication range A plural times within the prescribed duration. This enables unintentional opening and closing of the side door 106 to be suppressed. This thereby enables mistaken operation to be suppressed.

Furthermore, the control section 116 is connected to the vehicle exterior detection section 102. The vehicle exterior detection section 102 detects potential hazards present in the surroundings of the vehicle 104. In cases in which the vehicle exterior detection section 102 detects a potential hazard as the side door 106 transitions from the closed state to the open state, the control section 116 restricts the transition of the side door 106 from the closed state to the open state, such that the occupant P can be restricted from exiting the vehicle when a potential hazard is present in the surroundings of the vehicle 12. This enables safety when exiting the vehicle to be improved.

Furthermore, when the transition of the side door 106 from the closed state to the open state is restricted, the control section 116 displays display content indicating that the transition of the side door 106 from the closed state to the open state is restricted on the display section 112. Thus, in cases in which transition of the side door 106 to the open state is restricted due to the presence of a potential hazard in the surroundings of the vehicle 104, the occupant P is able to ascertain from the display section 112 that the transition of the side door 106 to the open state is restricted. This enables the occupant P to ascertain what is happening when the side door 106 behaves in a manner that does not correspond to their operation. This enables the occupant P to intuitively understand the operational state.

In the present exemplary embodiment, the display section 112 is configured to illuminate the indicator 110 in red on receiving information from the control section 116 that the opening action of the side door 106 has been stopped. However, there is no limitation thereto, and a display indicating that the opening action has been stopped may be performed on the display device 72 of the mobile terminal 22.

In the first and second exemplary embodiments described above, the power sliding door unit 38 is capable of transitioning the latch mechanism of the corresponding side door 18, 106 to either one out of the locked state or the lock-released state. However, there is no limitation thereto, and actuation of the power sliding door unit 38 may be coordinated with actuation of a door locking mechanism. Moreover, configuration may be made such that at least one out of locking or unlocking of a door locking mechanism can be performed in response to various acceptance operations performed using the mobile terminal 22.

Furthermore, the acceptance operation is performed by an operation to press a button displayed on the mobile terminal 22, or by an operation to tap plural times. However, there is no limitation thereto, and various other operations may be applied, such as an operation to hold the mobile terminal 22 within the communication range A for a prescribed duration, an operation to hold the mobile terminal 22 within the communication range A until a confirmation sound is heard, or an audio input operation.

Furthermore, although each of the side doors 18, 106 is configured by a sliding door, there is no limitation thereto, and the side doors 18, 106 may be configured by hinged swinging doors.

Furthermore, although the communication antenna 42 is configured by an NFC tag, there is no limitation thereto, and the communication antenna 42 may use another communication method to detect the mobile terminal 22.

Furthermore, although the door operation section 32 is an inner door handle, there is no limitation thereto, and another configuration such as a touch sensor may be applied.

Furthermore, although the communication antenna 42 is provided to the upper edge 30A of the door trim 30 that borders the lower end portion of the side window 29, there is no limitation thereto. The communication antenna 42 may be provided as plural antennae or as a continuous antenna at another location, such as at another location on the door trim 30 capable of accommodating cases in which the vehicle seat 16 is a non-standard state, or on the vehicle seat 16 or a pillar garnish serving as an interior member of the pillar 33.

Although the side doors 18, 106 are opened or closed when the acceptance operation has been detected by the corresponding confirmation action detection section 86, 114, there is no limitation thereto. The side doors 18, 106 may be opened or closed without such an acceptance operation being detected.

Although the control sections 88, 116 perform control so as to open or close the corresponding side doors 18, 106, there is no limitation thereto. The control sections 88, 116 may be configured so as to only perform a closing action, or only perform an opening action.

Although the vehicle seat 16 transitions to the standard state in cases in which the vehicle seat 16 is in a non-standard state when placing the corresponding side door 18, 106 in the open state, there is no limitation thereto. Configuration may be such that the vehicle seat 16 does not transition to the standard state.

Exemplary embodiments of the present disclosure have been described above. However, the present disclosure is not limited to the above description, and various other modifications may be implemented within a range not departing from the spirit of the present disclosure.

An object of the present disclosure is to provide greater convenience of operation.

A first aspect of the present disclosure is a vehicle door opening/closing control system that includes: a memory; and a processor connected to the memory, the processor being configured to: set a communication range inside a vehicle cabin of a vehicle, and detect whether or not a specific mobile terminal is positioned within the communication range; open and close a door of the vehicle; and transition the door to either an open state or a closed state in a case in which the mobile terminal has been detected as being positioned within the communication range.

According to the first aspect, an occupant sitting the vehicle seat inside the vehicle cabin is able to open and close the door by moving the mobile terminal to within the communication range, thereby allowing the occupant to open or close the door without greatly changing their seated posture.

Note that opening and closing of the door refers not only to the simple opening and closing action of the door itself, but also opening and closing of the door itself accompanying locking and unlocking of a door locking mechanism that restricts opening and closing of the door.

A second aspect of the present disclosure is the vehicle door opening/closing control system of the first aspect, wherein: the door may include a door trim that covers the door from inside the vehicle cabin, and a door operation device may input with an operation to open or close the door; and the communication range may be set at a vehicle cabin inner face of the door trim and at a vehicle rear side of the door operation device.

According to the second aspect, the communication range is set at the vehicle cabin inner face of the door trim that covers the door from the inside the vehicle cabin, and at the vehicle rear side of the door operation device that is used to input the operation to open or close the door. Namely, when opening or closing the door from inside the vehicle cabin, the occupant generally directs their attention toward the door. Thus, by setting the communication range at the vehicle cabin inner face of the door trim, the occupant is able to perform an intuitive operation to move the mobile terminal to within the communication range. Moreover, by setting the communication range at the vehicle rear side of the door operation device, the occupant in the seated state is able to open and close the door without having to reach out for the door operation device, which is generally located toward the vehicle front side of the door.

A third aspect of the present disclosure is the vehicle door opening/closing control system of the second aspect, wherein: the communication range may be set across a continuous range spanning from the vehicle rear side of the door operation device to a pillar positioned at the vehicle rear side of the door.

According to the third aspect, the communication range is set across a continuous range spanning from the vehicle rear side of the door operation device to the pillar positioned at the vehicle rear side of the door. This enables the occupant seated on the vehicle seat inside the vehicle cabin to easily move the mobile terminal to within the communication range, even in a state in which the occupant has slid the vehicle seat toward the vehicle rear side. Namely, the operation to open or close the door can be easily performed for various seated postures of the occupant.

The fourth aspect of the present disclosure is the vehicle door opening/closing control system of any of the first to third aspects, wherein the processor may be further configured to: detect a specific operation input to the mobile terminal; and transition the door to either an open state or a closed state in a case in which the mobile terminal has been detected as being positioned within the communication range and the specific operation has been detected.

According to the fourth aspect, the door is therefore not opened or closed in cases in which the specific operation has not been input, even if the mobile terminal has been moved to within the communication range. This enables unintentional opening and closing of the door to be suppressed.

A fifth aspect of the present disclosure is the vehicle door opening/closing control system of the fourth aspect, that may further include: a display device that enables an occupant inside the vehicle cabin to view display content, wherein the processor may further be configured to detect, as the specific operation, an operation to accept specific display content displayed on the display device.

According to the fifth aspect, an operation by the occupant inside the vehicle cabin to accept specific display content displayed on the display device that enables viewing of display content is detected as the specific operation. Thus, even if the mobile terminal has been moved to within the communication range, the door is not opened or closed unless the acceptance operation has been performed, thereby enabling unintentional opening and closing of the door to be suppressed.

A sixth aspect of the present disclosure is the vehicle door opening/closing control system of the fourth aspect, wherein: the processor may further be configured to detect, as the specific operation, an operation in which the mobile terminal is moved from outside the communication range to within the communication range a plurality of times within a prescribed duration.

According to the sixth aspect, an operation in which the mobile terminal is moved from outside the communication range to within the communication range plural times within the prescribed duration is detected as the specific operation. Thus, when there is no intent to open or close the door, even if the mobile terminal moves to within the communication range the door is not opened or closed as long as the mobile terminal is not moved from outside the communication range to within the communication range plural times within the prescribed duration. This enables unintentional opening and closing of the door to be suppressed.

A seventh aspect of the vehicle door opening/closing control system of any of the first to sixth aspects, wherein: a vehicle seat provided near to the door may be capable of at least one of movement along a vehicle front-rear direction or reclining of a seatback; and the communication range may be set to a range corresponding to at least one of a front-rear direction movement range of the vehicle seat or a reclining range of the seatback.

According to the seventh aspect, the vehicle seat is capable of at least one out of movement along the vehicle front-rear direction or reclining of the seatback. The communication range is set to a range that accommodates at least one out of the front-rear direction movement range of the vehicle seat or the reclining range of the seatback. Namely, this allows the occupant sitting on the vehicle seat to perform an operation to open or close the door without greatly shifting from their seated posture, even in a state in which the vehicle seat has been slid or reclined.

The eighth aspect of the disclosure is the vehicle door opening/closing control system of any of the first to seventh aspects, wherein the processor may further be configured to: detect a potential hazard present in surroundings of the vehicle; and restrict transition of the door from a closed state to an open state in a case in which the potential hazard has been detected during transition of the door from the closed state to the open state.

According to the eighth aspect, the occupant can be restricted from exiting the vehicle when a potential hazard is present in the surroundings of the vehicle.

Note that potential hazards include objects present in the surroundings of the vehicle that require caution, for example other vehicles and pedestrians.

The ninth aspect of the disclosure is the vehicle door opening/closing control system of the fifth aspect, wherein the processor may further be configured to: detect a potential hazard present in surroundings of the vehicle; restrict transition of the door from the closed state to the open state in a case in which the potential hazard has been detected during transition of the door from the closed state to the open state; and display, on the display device, display content indicating that transition of the door from the closed state to the open state is restricted in a case in which transition of the door from the closed state to the open state is restricted.

According to the ninth aspect, in cases in which transition of the door to the open state is restricted due to the presence of a potential hazard in the surroundings of the vehicle, the occupant is able to ascertain from the display device that the transition of the door to the open state is restricted. This enables the occupant to ascertain what is happening when the door behaves in a manner that does not correspond to their operation.

A tenth aspect of the present disclosure is a non-transitory recording medium that records a program that is executable by a computer to perform a vehicle door opening/closing control processing, the vehicle door opening/closing control processing that includes: setting a communication range inside a vehicle cabin of a vehicle, and detecting whether or not a specific mobile terminal is positioned within the communication range; opening and closing a door of the vehicle; and transitioning the door to either an open state or a closed state in a case in which the mobile terminal has been detected as being positioned within the communication range.

According to the tenth aspect, an occupant sitting the vehicle seat inside the vehicle cabin is able to open and close the door by moving the mobile terminal to within the communication range and inputting the mobile terminal with the specific operation, thereby allowing the occupant to open or close the door without greatly changing their seated posture.

The first to ninth aspect may be realized in a form of a method or a non-transitory recording medium.

The vehicle door opening/closing control system of the first aspect is capable of providing greater convenience of operation.

The vehicle door opening/closing control system of the second aspect is capable of providing even greater convenience of operation.

The vehicle door opening/closing control system of the third and seventh aspects is capable of providing greater convenience of operation for various seat positions.

The vehicle door opening/closing control system of the fourth to sixth aspects is capable of suppressing mistaken operation.

The vehicle door opening/closing control system of the eighth aspect is capable of improving safety when exiting the vehicle.

The vehicle door opening/closing control system of the ninth aspect is capable of enabling the occupant to intuitively understand the operational state.

The non-transitory recording medium recorded with the door opening/closing program of the tenth aspect is capable of providing greater convenience of operation.

The invention claimed is:

1. A vehicle door opening/closing control system comprising:
   a memory; and
   a processor connected to the memory, the processor being configured to:
      set a communication range inside a vehicle cabin of a vehicle;
      detect whether or not a mobile terminal of an occupant inside the vehicle cabin is positioned within the communication range, wherein the mobile terminal is a computer;
      open and close a side door of the vehicle, wherein the door serves for entering and exiting of the occupant;
      detect, as a specific operation of the mobile terminal, an operation in which the mobile terminal is moved from outside the communication range to within the communication range a plurality of times within a prescribed duration;
      determine whether the door is in a closed state or an open state; and
      in response to the mobile terminal having been detected as being positioned within the communication range and the specific operation having been detected, transition the door from the closed state to the open state or from the open state to the closed state.

2. The vehicle door opening/closing control system of claim 1, wherein:
   the door includes a door trim that covers the door from inside the vehicle cabin, and a door operation section configured to be used to open or close the door; and
   the communication range is set at a vehicle cabin inner face of the door trim and at a vehicle rear side of the door operation section.

3. The vehicle door opening/closing control system of claim 2, wherein:
   the communication range is set across a continuous range spanning from the vehicle rear side of the door operation section to a pillar positioned at the vehicle rear side of the door.

4. The vehicle door opening/closing control system of claim 1, further comprising:
   a display that enables the occupant inside the vehicle cabin to view display content.

5. The vehicle door opening/closing control system of claim 4, wherein the processor is further configured to:
   detect a potential hazard present in surroundings of the vehicle;
   restrict transition of the door from the closed state to the open state in a case in which the potential hazard has been detected during transition of the door from the closed state to the open state; and
   display, on the display, display content indicating that transition of the door from the closed state to the open state is restricted in a case in which transition of the door from the closed state to the open state is restricted.

6. The vehicle door opening/closing control system of claim 1, wherein
   a vehicle seat provided near to the door is capable of at least one of movement along a vehicle front-rear direction or reclining of a seatback; and
   the communication range is set to a range corresponding to at least one of a front-rear direction movement range of the vehicle seat or a reclining range of the seatback.

7. The vehicle door opening/closing control system of claim 1, wherein the processor is further configured to:
   detect a potential hazard present in surroundings of the vehicle; and
   restrict transition of the door from the closed state to the open state in a case in which the potential hazard has been detected during transition of the door from the closed state to the open state.

8. A vehicle door opening/closing control method comprising:
   by a processor,
      setting a communication range inside a vehicle cabin of a vehicle;
      detecting whether or not a mobile terminal of an occupant inside the vehicle cabin is positioned within the communication range, wherein the mobile terminal is a computer;
      opening and closing a side door of the vehicle, wherein the door serves for entering and exiting of the occupant;
      detecting, as a specific operation of the mobile terminal, an operation in which the mobile terminal is moved from outside the communication range to within the communication range a plurality of times within a prescribed duration;
      determining whether the door is in a closed state or an open state; and
      in response to the mobile terminal having been detected as being positioned within the communication range and the specific operation having been detected, transitioning the door from the closed state to the open state or from the open state to the closed state.

9. The vehicle door opening/closing control method of claim 8, wherein:
   the door includes a door trim that covers the door from inside the vehicle cabin, and a door operation section configured to be used to open or close the door; and
   the communication range is set at a vehicle cabin inner face of the door trim and at a vehicle rear side of the door operation section.

10. The vehicle door opening/closing control method of claim 9, wherein:
    the communication range is set across a continuous range spanning from the vehicle rear side of the door operation section to a pillar positioned at the vehicle rear side of the door.

11. The vehicle door opening/closing control method of claim 8, wherein
    a vehicle seat provided near to the door is capable of at least one of movement along a vehicle front-rear direction or reclining of a seatback; and
    the communication range is set to a range corresponding to at least one of a front-rear direction movement range of the vehicle seat or a reclining range of the seatback.

12. The vehicle door opening/closing control method of claim 8, further comprising:
    detecting a potential hazard present in surroundings of the vehicle; and
    restricting transition of the door from the closed state to the open state in a case in which the potential hazard has been detected during transition of the door from the closed state to the open state.

13. The vehicle door opening/closing control method of claim 8, further comprising:

> detecting a potential hazard present in surroundings of the vehicle;
>
> restricting transition of the door from the closed state to the open state in a case in which the potential hazard has been detected during transition of the door from the closed state to the open state; and
>
> displaying, on a display that enables the occupant inside the vehicle cabin to view display content, display content indicating that transition of the door from the closed state to the open state is restricted in a case in which transition of the door from the closed state to the open state is restricted.

14. A non-transitory recording medium that records a program that is executable by a computer to perform a vehicle door opening/closing control method, the vehicle door opening/closing control method comprising:

> setting a communication range inside a vehicle cabin of a vehicle;
>
> detecting whether or not a mobile terminal of an occupant inside the vehicle cabin is positioned within the communication range, wherein the mobile terminal is a computer;
>
> opening and closing a side door of the vehicle, wherein the door serves for entering and exiting of the occupant;
>
> detecting, as a specific operation of the mobile terminal, an operation in which the mobile terminal is moved from outside the communication range to within the communication range a plurality of times within a prescribed duration;
>
> determining whether the door is in a closed state or an open state; and
>
> in response to the mobile terminal having been detected as being positioned within the communication range and the specific operation having been detected, transitioning the door from the closed state to the open state or from the open state to the closed state.

\* \* \* \* \*